United States Patent [19]
Peterson

[11] 3,909,647
[45] Sept. 30, 1975

[54] ROTOR ASSEMBLY FOR PERMANENT MAGNET GENERATOR

[75] Inventor: A. Duane Peterson, Bainbridge, N.Y.

[73] Assignee: The Bendix Corporation, Southfield, Mich.

[22] Filed: June 22, 1973

[21] Appl. No.: 372,718

[52] U.S. Cl. .................. 310/156; 310/44; 310/261; 310/267
[51] Int. Cl.² .................................... H02K 21/02
[58] Field of Search ......... 310/44, 156, 45, 267, 85; 75/200, 206, 208, 212, 201; 148/101, 102; 29/598, 602

[56] References Cited
UNITED STATES PATENTS

| | | | |
|---|---|---|---|
| 3,061,482 | 10/1962 | Grant | 75/206 |
| 3,221,194 | 11/1965 | Blackburn | 310/156 |
| 3,325,282 | 6/1967 | Mayer et al. | 75/208 R |
| 3,360,350 | 12/1967 | Sama | 75/208 R |
| 3,531,670 | 9/1970 | Loudon | 310/156 |
| 3,558,941 | 1/1971 | Brebbia et al. | 310/156 |
| 3,636,392 | 1/1972 | Gerry | 310/267 |
| 3,639,181 | 2/1972 | Cech | 75/201 |
| 3,655,464 | 4/1972 | Benz | 75/208 R |
| 3,663,850 | 3/1972 | Phelon | 310/267 |
| 3,707,638 | 12/1972 | Nailen | 310/156 |
| 3,723,197 | 3/1973 | Buschow et al. | 148/101 |
| 3,775,100 | 11/1973 | Kizer | 75/212 |

Primary Examiner—J. D. Miller
Assistant Examiner—Patrick R. Salce
Attorney, Agent, or Firm—Raymond J. Eifler

[57] ABSTRACT

A permanent magnet generator rotor assembly having a sintered cobalt alloy magnet integral with a ferromagnetic hub or shaft. To assure that the magnet develops maximum magnetic energy, the magnet is separated from the ferromagnetic hub or shaft by a high temperature material such as aluminum oxide (a ceramic).

11 Claims, 4 Drawing Figures

ROTOR ASSEMBLY FOR PERMANENT MAGNET GENERATOR

CROSS-REFERENCE TO RELATED APPLICATIONS

This application is related to a co-pending patent application Ser. No. 372,717 filed June 22, 1973 entitled "Process for Making a Rotor Assembly for a Permanent Magnet Generator," filed concurrently with this application.

BACKGROUND OF THE INVENTION

This invention relates to rotary electrical apparatus such as electrical generators and motors. This invention is more particularly related to a novel rotor assembly for a permanent magnet generator.

A permanent magnet generator is generally comprised of a rotor assembly that includes a plurality of equally spaced magnetic poles of alternating polarity around the radially outer surface of the rotor and a stator which generally includes a plurality of windings and magnetic poles of alternating polarity. Rotation of the rotor causes the permanent magnets to pass by the stator poles and coils and thereby induce an electric current to flow in each of the coils. A more detailed description of a permanent magnet generator may be found in U.S. Pat. No. 3,531,670 entitled "Rotary Electrical Apparatus Having Metallic Sleeve for Embracing the Peripheral Sections of Permanent Magnet Rotor" issued Sept. 29, 1970 to D.C. Loudon, hereby expressly incorporated by reference.

It has been known for sometime that a generally ring-shaped permanent magnet rotor assembly is a practical and efficient configuration of the rotor assembly. Early attempts at such a configuration included assembling a plurality of bar-type permanent magnets retained in a radial direction by circumferential support rings to form a one-piece ring-shaped permanent magnet having a plurality of equally spaced magnetic poles of alternating polarity around its radially outer surface. An example of such a configuration may be found in U.S. Pat. No. 3,221,194 entitled "Permanent Magnet Rotor" issued Nov. 30, 1965 to A.B. Blackburn, hereby expressly incorporated by reference. The Blackburn patent and the Loudon patent show the development of permanent magnet rotor assemblies. Blackburn utilized a plurality of bar-shaped magnets arranged to make a single ring-shaped magnet and Loudon utilized a plurality of annular ceramic magnets arranged to form a single ring-shaped magnet.

In the aforementioned patents and the prior art, as a whole, it has been an object to obtain maximum energy from permanent magnet generators. However, attempts to maximize electrical energy output have been limited by either limitations of the permanent magnet material itself or the loss or reduction of magnetic properties during fabrication of the magnet or rotor assembly. With respect to the magnet material itself, it has been discovered that colbalt alloyed with a rare earth metal such as samarium may be used to fabricate (by sintering) a one piece ring-shaped magnet with radial orientation and superior magnet properties. Such magnets are generally fabricated from a powdered alloy of cobalt and a rare earth metal, such as samarium. The powdered alloy is placed in a ring-shaped silicon rubber mold or die cavity, subjected to a radially oriented magnetic field and then compacted and sintered to form the magnet. After sintering, the unmagnetized magnet is assembled into a rotor assembly wherein the magnetic qualities of the ring-shaped magnet are realized by placing the magnet in a charging device such as an inpulse magnetizer of the capacitor discharge type which subjects the magnet to an mmf pulse by a properly directed, short duration, high amplitude, direct current, pulse.

One method of fabricating an integral rotor assembly of the aforementioned cobalt alloy is to insert a rotor shaft or hub into a mold or die cavity and then add a cobalt rare earth alloy powder which is pressed and sintered around the hub or shaft to form the integral rotor assembly. However, although this procedure results in an improvement permanent magnet generator rotor assembly, the fabrication process may result in a reduction of the optimum obtainable magnetic properties of the cobalt alloy magnet.

SUMMARY OF THE INVENTION

This invention provides an integral rotor assembly for a permanent magnet generator whose permanent magnetic properties may be optimized after completion of the fabrication process. This is accomplished by introducing a barrier of ceramic material between the magnetic flux carrier (hub or shaft) and the cobalt alloy magnet so that when the cobalt alloy is sintered to the flux carrier, migration of the flux carrier material to the cobalt alloy and hence poisoning of the magnet is prevented.

The invention is a permanent magnet rotor assembly comprised of a radially oriented cobalt alloy ring magnet pressed and sintered directly on the rotor shaft or hub and characterized by a barrier of high temperature inert material disposed between the magnet and the soft ferromagnetic hub or shaft. The inert material may be chosen from any inert material that will not melt during the sintering of the cobalt alloy and is preferably a ceramic or ceramic like material such as magnesium and aluminum oxides.

In one embodiment of the invention, the novel rotor assembly is included in combination with a rotary electrical apparatus of the type having a stator 71 and a rotor assembly 1 with a radial air gap between the adjacent peripheries of the stator 71 and rotor 1, the novel rotor assembly comprising: a rotor shaft 10; a ring 20 of soft ferromagnetic material telescoped over the shaft 10; a layer of high temperature material 30 selected from the group consisting of zirconium oxide, magnesium oxide, berylium oxide, titanium oxide and aluminum oxide, disposed on the outside surface of the flux carrier ring 20; a ring-shaped permanent magnet 40 telescoped over the flux carrier ring 20, the magnet 40 being formed of a single section of sintered material consisting essentially of an alloy of cobalt and at least one rare earth metal, and having a plurality of equally spaced first magnetic poles of alternating polarity of its radially outer surface and a plurality of second magnetic poles at its radially inner surface adjacent the flux carrier ring 20, the second poles being generally radially aligned with the respective first poles and of opposite polarity therefrom; and means for securing the magnet 40 and the flux carrier ring 20 to the rotor shaft 10.

Accordingly, it is an object of this invention to provide a one-piece integral rotor assembly which includes a sintered cobalt alloy magnet that retains its magnetic energy when made an integral part of the rotor assembly.

It is another object of this invention to prevent metallurgical contamination of the cobalt alloy magnet with material from the flux conducting element mounted integral therewith.

It is still another object of this invention to provide a dielectric barrier between a ferromagnetic flux carrier and an integral sintered samarium cobalt magnet so that migration of the flux carrier material into the samarium cobalt magnet is prevented.

It is a further object of this invention to provide an improved rotor assembly capable of producing a greater amount of electrical energy than previous rotor assemblies.

It is still a further object of this invention to provide a combination that allows the use of rare earth cobalt alloys to fabricate magnets integrally on a soft ferromagnetic flux conductor.

It is yet another object of this invention to provide an integral assembly that utilizes a single ring magnet in lieu of a plurality of bar magnets bonded together.

The above and other objects and features of the invention will become apparent from the following detailed description taken in conjunction with the accompanying drawings and claims which form a part of this specification.

DETAILED DESCRIPTION OF THE DRAWINGS

Figure 1:
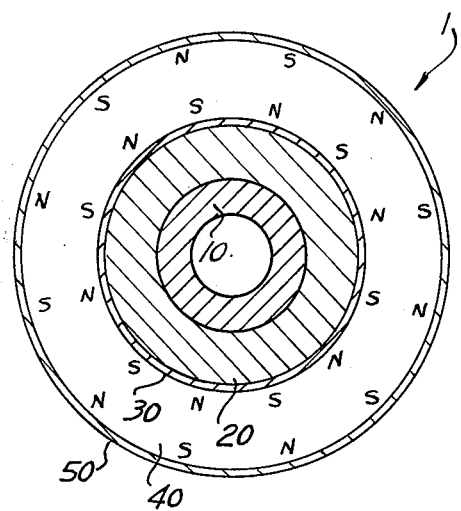
FIG. 1 is a diagrammatic section view of a rotor assembly embodying the principles of this invention.

Referring now to the drawings, FIG. 1 illustrates an integral rotor assembly embodying the principles and objects of this invention. The rotor assembly 1 comprises: a rotor shaft 10; a hub 20; a zirconium oxide barrier 30 disposed on the outside surface of the hub 20; a single piece radially oriented ring magnet 40; and a magnet retaining sleeve 50.

The magnet retaining sleeve 50 functions to strengthen the rotor assembly which is subject to varying degrees of radial force during rotation. The magnetic retaining sleeve 50 generally is comprised of a strong nonmagnetic metal such as inconel, which is heat shrunk upon the magnet 40. Where the speed of the rotor will not be very high, the magnet retaining sleeve 50 would probably not be necessary in view of the low magnitude radial forces to which the magnet 40 would be subjected.

The ring-shaped magnet 40 is a single piece magnet having a plurality of radially oriented poles of alternating polarity (N and S) which is comprised of a sintered cobalt alloy. The cobalt alloy preferred consists essentially of cabalt combined with at least one rare earth metal. The preferred rare earth elements being samarium and praseodymium although other rare earth metals depending on their availability and cost may also be used. Cobalt alloys containing at least one rare earth element are presently available from the Raytheon Corporation, Waltham, Mass. A preferred alloy would be about 37 percent (by weight) samarium and the balance cobalt. As previously described in the background of the invention, the ring-shaped magnet 40 has been magnetized so that there are a plurality of equally spaced first magnetic poles (N and S) of alternating polarity at its radially outer surface and a plurality of second magnetic poles (N and S) at its radially inner surface adjacent the hub or flux carrier ring 20.

The hub 20 which is the flux carrier for the permanent magnet ring 40 may be comprised of any suitable soft ferromagnetic material. In most rotor assemblies, the ring magnet 40 is mounted directly onto the hub 20 which then in turn is mounted to the shaft 10 by some suitable means such as welding, end plates, etc.

The essential feature of this invention in the novel rotor assembly is an inert layer 30 which is disposed as a barrier between the outer periphery of the hub 20 and the inner periphery of the ring-shaped magnet 40. This barrier 30 of inert material is preferably a layer of material that is coated on the outer surface of the hub 20 as an integral part thereof and which later becomes an integral part of the inner surface of the ring-shaped magnet 40 which is compacted and sintered upon the hub 20. Generally, this is accomplished by placing the powdered cobalt rare earth alloy in a silicon rubber mold or die cavity in which the hub is already located, subjecting the powdered alloy to a radially oriented magnetic field, and then compressing and sintering the material to the hub 20. The preferred process for making the hub 20 and the ring-shaped magnet 40 an integral piece is sintering, which is a process wherein the particles of the rare earth cobalt alloy are welded together by subjecting the compacted powder to a temperature below the melting point thereof but sufficient enough to allow the powdered metal particles to coalesce. In view of the fact that cobalt has a melting point of 1493°C. and its rare earth alloys have comparable melting points, it is important that the inert material 30 which forms a barrier between the cobalt alloy magnet 40 and the hub 40 be a high temperature alloy so that during the sintering process, the barrier is not vaporized or melted away leaving voids which would allow migration of the ferromagnetic material of the hub 20 into the cobalt alloy, an effect that may result in the lessening of the magnetic properties of the cobalt alloy after sintering.

The barrier 30 is preferably therefore a ceramic or suitable high temperature inorganic oxide, organic materials being unsuitable because of their inability to maintain their barrier function during and after exposure to the temperatures necessary to sinter cobalt alloys. Examples of suitable inorganic oxides are magnesium oxide, berylium oxide, zirconium oxide, titanium oxide, and aluminum oxide; zirconium oxide and aluminum oxide being preferred. It should be noted at this point that any inert material that hs thermal properties sufficient to maintain its integrity as a barrier during and after the sintering of the cobalt alloy to the hub is suitable. Such dielectric materials may be selected from any standard "Handbook of Chemistry and Physics."

With respect to applying a metal oxide coating 30 to the hub 20, the process of metal spraying or flame spraying may be used. Metal spraying is a method of spraying metal through a gun for the purpose of coating different objects. The gun commonly used is a gas gun. In this gun the metal to be sprayed is introduced in the form of wire through a central tube. Through an annular space surrounding this tube a gaseous mixture either hydrogen or acetylene with oxygen or air, is passed, which upon burning at the orifice, melts the wire in the inner part of the conical flame. Compressed air or other gas (e.g., oxygen) is passed through an outer annular space for the purpose of atomizing, spraying and oxidizing the sprayed metal. Another suitable process for coating an object with a dielectric material is radio frequency sputtering which is the process of applying molecular insulating coatings to an object. Suitable apparatus for this purpose are commercially known and may be obtained from The Bendix Corporation, Scientific Instruments & Equipment Division, Rochester, N.Y., which markets a device known as a plasmavac capable of coating objects with electrically insulating coatings.

Although the hub 20 is a separate element physically mounted on the rotor shaft 10 the rotor shaft 10 and hub 20, if desired, may be formed from a single piece.

Figure 2:
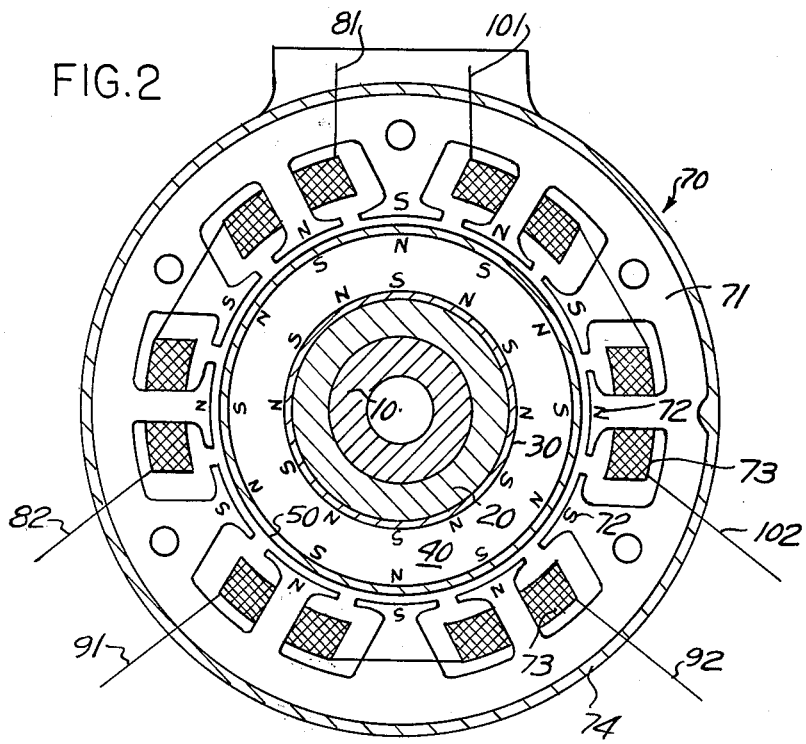
FIG. 2 is a diagrammatic view of a permanent magnet generator which utilizes the rotor assembly shown in FIG. 1.

FIG. 2 illustrates a diagrammatic view of an electrical generator, i.e., stator assembly 70 and the rotor assembly 1 illustrated in FIG. 1. Such a generator has a stator 71 formed of a plurality of laminations, the stator 70 telescoped within and secured to a housing 74 by some suitable means (not shown). The rotor assembly 1 which includes the rotor shaft 10, the hub 20, the barrier 30, the annular magnet 40, and the magnet retaining sleeve 50 is journalled in the housing 74 by a forward and rear bearing (not shown). The stator 71 has a plurality of equally spaced and annularly arranged pole pieces 72 of alternate polarity, with every other pole piece having a coil or winding 73 thereabout. The windings or coils 73 are generally all wound in the same direction and are preferably connected in electrical series relationship. Upon rotation of the rotor assembly, there are thus formed three separate sources of continuous alternating current, the first source having leads 81, 82, the second source having leads 91, 92 and the third source having leads 101, 102.

Figure 3:
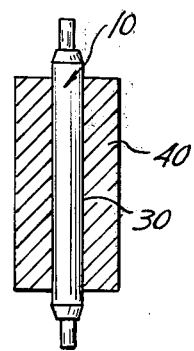
FIG. 3 illustrates a simplified construction of a rotor assembly incorporating the principles of this invention.

FIG. 3 is a simplified diagrammatic view of a rotor assembly that incorporates the objects of this invention. In this embodiment there is no hub portion as the flux carrier for the magnet 40 is a ferromagnetic shaft 10. The ferromagnetic shaft 10 has a suitable ceramic material coated thereon, such as zirconium or aluminum oxide so that when the magnet 40 is sintered upon the shaft 10, no migration of soft ferromagnetic shaft material into the cobalt alloy takes place.

Figure 4:
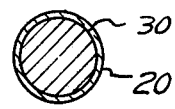
FIG. 4 illustrates a flux conducting member which may be used to accomplish the objects of this invention.

FIG. 4 is a cross-section view of an elongated rotor shaft 20 which includes a suitable ceramic type dielectric coating 30 thereon. Such a shaft is suitable for having samarium cobalt magnet sintered thereto.

While a preferred embodiment of the invention has been disclosed, it will be apparent to those skilled in the art that changes may be made to the invention as set forth in the appended claims and, in some instances, certain features of the invention may be used to advantage without corresponding use of other features.

Accordingly, it is intended that the illustrative and descriptive materials herein be used to illustrate the principles of the invention and not to limit the scope thereof.

Having described the invention, what is claimed is:

1. A rotor assembly comprising:

an annular member consisting essentially of cobalt and at least one rare earth metal in alloy form, said member having sections magnetized about the periphery thereof alternately in opposite polarity, said annular member having an axial bore extending therethrough;

a shaft extending through said axial bore, said shaft comprised of a ferromagnetic material, and mounted for rotational movement with said annular member; and a continuous layer of inert material having a melting point above the sintering temperature of said cobalt alloy, said layer disposed between the wall of said bore and said shaft to provide a barrier between said cobalt rare earth alloy and said ferromagnetic material, said annular member, said shaft and said layer forming an integral rotor assembly.

2. A rotor assembly as recited in claim 1 wherein the shaft is comprised of a ferromagnetic material and said inert material selected from the group consisting of aluminum oxide or zirconium oxide.

3. A rotor assembly comprising:

an annular member consisting essentially of a samarium cobalt alloy, said member having sections magnetized about the periphery thereof alternately in opposite polarity, said annular member having an axial bore extending therethrough;

a shaft extending through said axial bore, said shaft comprised of a ferromagnetic material and mounted for rotational movement with said annulur member; and a continuous layer of material selected from the group consisting of zirconium oxide, magnesium oxide, berylium oxide, titanium oxide, and aluminum oxide, said layer disposed between the wall of said bore and said shaft to provide a barrier between said annular member and said shaft, said annular member, said shaft and said layer forming an integral rotor assembly.

4. A rotor assembly as recited in claim 3 wherein the shaft is comprised of a ferromagnetic material.

5. A rotor assembly comprising:

an annular member consisting essentially of cobalt and at least one rare earth metal, said member having sections magnetized about the periphery thereof alternately in opposite polarity, said annular member having an axial bore extending therethrough;

a shaft;

a hub mounted on said shaft and extending into said axial bore, said hub comprised of a ferromagnetic material; and a continuous layer of material selected from the group consisting of zirconium oxide, magnesium oxide, and aluminum oxide, disposed on the surface of said hub to provide a barrier between said ferromagnetic material of said hub and said cobalt rare earth alloy material of said annular member, said annular member, said shaft, said hub and said layer forming an integral rotor assembly.

6. In a rotary electrical apparatus having a stator and a rotor with a radial air gap between the adjacent peripheries of the stator and the rotor, the improved rotor which comprises:

a rotor shaft;

a flux carrier ring comprised of a ferromagnetic material telescoped over said shaft;

a layer of material selected from the group consisting of zirconium oxide, magnesium oxide, berylium oxide, titanium oxide, and aluminum oxide, disposed on the outside surface of said flux carrier ring;

a ring-shaped permanent magnet over said flux carrier ring, said magnet being formed of sintered material consisting essentially of cobalt alloyed with at least one rare earth metal, and having a plurality of equally spaced first magnetic poles of alternating polarity at its radially outer surface and a plurality of second magnetic poles at its radially inner surface adjacent said flux carrier ring, said second poles being generally radially aligned with respective first poles and of opposite polarity therefrom;

means for securing flux carrier ring to said rotor shaft; and a metallic sleeve embracing the peripheral surface of said magnet in said air gap.

7. In a rotary electrical apparatus having a stator and a rotor with a radial air gap between the adjacent peripheries of the stator and the rotor, the improved rotor which comprises:

a rotor shaft;

a magnetic flux carrier ring telescoped over said shaft;

a layer of ceramic material disposed on the outside surface of said flux carrier ring;

a ring-shaped permanent magnet over said flux carrier ring, said magnet being formed of a single section of a pressed and sintered rare earth cobalt alloy and having a plurality of equally spaced first magnetic poles of alternating polarity at its radially outer surface and a plurality of second magnetic poles at its radially inner surface adjacent said flux carrier ring, said second poles being generally radially aligned with respective first poles and of opposite polarity therefrom; and means for securing said flux carrier ring to said rotor shaft.

8. In a rotary electrical apparatus having a stator and a rotor with a radial air gap between the adjacent peripheries in the stator and the rotor, the improved rotor which comprises:

a rotor shaft;

a magnetic flux carrier ring of ferromagnetic material telescoped over said shaft;

a layer of material selected from the group consisting of zirconium oxide, magnesium oxide, and aluminum oxide, disposed between said flux conducting ring and said magnet;

a ring-shaped permanent magnet telescoped over said flux carrier ring, said magnet being formed of sintered material consisting essentially of cobalt and at least one rare earth metal and having a plurality of equally spaced first magnetic poles of alternating polarity at its radially outer surface and a plurality of second magnetic poles at its radially inner surface adjcent said flux carrier ring, said second poles being generally radially aligned with respective first poles and of opposite polarity therefrom;

means for securing said flux carrier ring to said rotor shaft; and a metallic sleeve embracing the peripheral surface of said magnet in said air gap.

9. A rotor construction comprising:

a cylindrical member of permanent magnet material having an axial bore therethrough, said member comprised of cobalt and at least one rare earth metal, said magnet member having a plurality of equally spaced first magnetic poles of alternating polarity at its radially outer surface;

a shaft comprised of ferromagnetic material, said shaft extending through said axial bore in said magnet member;

a coating of material selected from the group consisting of zirconium oxide, magnesium oxide, and aluminum oxide, on the surface of said shaft; and means for securing said shaft to said cylindrical member to form an integral rotor assembly.

10. A rotor construction comprising:

a cylindrical member of permanent magnet material having an axial bore therethrough, said member comprised of cobalt and at least one rare earth metal, said magnet member having a plurality of equally spaced first magnetic poles of alternating polarity at its radially outer surface;

a shaft comprised of a ferromagnetic material, said shaft extending through said axial bore in said magnet member;

a coating of material selected from the group consisting of zirconium oxide, magnesium oxide, and aluminum oxide on the surface of said shaft;

means for securing said shaft to said magnetic member to form an integral rotor assembly, and a nonmagnetic sleeve surrounding the outer peripheral surface of the cylindrical member.

11. A rotor assebly comprising:

an annular member having sections magnetized about the periphery thereof alternately in opposite polarity, said annular member having an axial bore extending therethrough;

a shaft extending through said axial bore, said shaft comprised of a ferromagnetic material, and mounted for rotational movement with said annular member; and a continuous layer of material selected from the group consisting of zirconium oxide, magnesium oxide, berylium oxide, titanium oxide, and aluminum oxide, said layer disposed between the wall of said bore and said shaft to provide a barrier between said cobalt alloy and said flux conducting material, said annular member, said shaft and said layer forming an integral rotor assembly.

* * * * *

UNITED STATES PATENT OFFICE
CERTIFICATE OF CORRECTION

PATENT NO. : 3,909,647
DATED : September 30, 1975
INVENTOR(S) : A. Duane Peterson It is certified that error appears in the above-identified patent and that said Letters Patent are hereby corrected as shown below:

Column 2, line 57, change "of" in the second instance to --at--.

Column 3, Line 61, change "cabalt" to --cobalt--.

Column 4, line 58, change "hs" to --has--.

Column 8, line 40, change "assebly" to --assembly--.

Column 8, line 54, after the word "said" in the second instance, delete the words "flux conducting" and insert therefor --ferromagnetic--.

Signed and Sealed this third Day of February 1976

[SEAL]

Attest:

RUTH C. MASON
Attesting Officer

C. MARSHALL DANN
Commissioner of Patents and Trademarks